(12) United States Patent
Black et al.

(10) Patent No.: US 7,566,987 B2
(45) Date of Patent: Jul. 28, 2009

(54) METHOD OF POWERING UP A PLURALITY OF LOADS IN SEQUENCE

(75) Inventors: Richard L. Black, Gilbertsville, PA (US); Joel Hnatow, Bethlehem, PA (US); Neil Orchowski, Philadelphia, PA (US); Jason P. Petrella, Center Valley, PA (US); Brian R. Valenta, Macungie, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 193 days.

(21) Appl. No.: 11/900,855

(22) Filed: Sep. 13, 2007

(65) Prior Publication Data

US 2008/0067871 A1 Mar. 20, 2008

Related U.S. Application Data

(60) Provisional application No. 60/844,602, filed on Sep. 14, 2006.

(51) Int. Cl.
*H02J 3/00* (2006.01)
*G06F 1/00* (2006.01)

(52) U.S. Cl. .................................. 307/41; 713/330
(58) Field of Classification Search ............... 307/41; 713/300
See application file for complete search history.

(56) References Cited

U.S. PATENT DOCUMENTS

| 4,056,757 | A |   | 11/1977 | Mauch et al. |
|---|---|---|---|---|
| 4,593,349 | A | * | 6/1986 | Chase et al. ............. 713/330 |
| 4,799,039 | A |   | 1/1989 | Balcom et al. |
| 5,119,014 | A |   | 6/1992 | Kronberg |
| 5,237,207 | A |   | 8/1993 | Kwiatkowski et al. |
| 5,734,230 | A |   | 3/1998 | Edwards |
| 5,910,689 | A |   | 6/1999 | Ertz, III et al. |

(Continued)

FOREIGN PATENT DOCUMENTS

EP 0220504 A2 5/1987

(Continued)

OTHER PUBLICATIONS

Lutron Application Note #106, Emergency Lighting Systems, 2003, Lutron Electronics, Co. Inc, 10 pages.

*Primary Examiner*—Albert W Paladini
*Assistant Examiner*—Michael Rutland Wallis
(74) *Attorney, Agent, or Firm*—Woodcock Washburn LLP

(57) ABSTRACT

Power distribution systems that have a limited peak power capability or a high source impedance, such as site supply generators, are often susceptible to abnormal operation in response to the current drawn at power up from the loads connected to the power distribution system. The present invention provides a lighting control system operable to power up a plurality of the lighting loads in sequence to reduce stress on the power distribution system. The lighting loads are each turned on as part of a startup sequence at predetermined times after an output voltage of the power distribution system has stabilized. The lighting control system is operable to begin the startup sequence in response to receiving a control signal representative that the power distribution system has stabilized. The lighting loads are each controlled by a lighting control module, which is operable to wait for a predetermined amount of time for the startup sequence to begin before turning on the lighting loads.

25 Claims, 13 Drawing Sheets

U.S. PATENT DOCUMENTS

| | | |
|---|---|---|
| 5,990,635 A | 11/1999 | Ference et al. |
| 6,091,205 A | 7/2000 | Newman, Jr. et al. |
| 6,119,469 A | 9/2000 | Elwood |
| 6,252,753 B1 | 6/2001 | Bhargava |
| 6,380,692 B1 | 4/2002 | Newman, Jr. et al. |
| 6,429,706 B1 * | 8/2002 | Amin et al. ................. 327/143 |
| 6,528,957 B1 | 3/2003 | Luchaco |
| 6,803,728 B2 | 10/2004 | Balasubramaniam et al. |
| 6,917,124 B2 * | 7/2005 | Shetler et al. ................. 307/66 |
| 6,927,547 B2 | 8/2005 | Walko, Jr. et al. |
| 7,259,524 B2 | 8/2007 | Hausman, Jr. et al. |
| 7,278,036 B2 * | 10/2007 | Yuan .......................... 713/300 |
| 2002/0175641 A1 | 11/2002 | Andersen |
| 2003/0105984 A1 | 6/2003 | Masuyama et al. |
| 2004/0124710 A1 | 7/2004 | Pfeiffer |
| 2005/0057875 A1 | 3/2005 | Kover, Jr. et al. |
| 2005/0134121 A1 | 6/2005 | Lathrop et al. |

FOREIGN PATENT DOCUMENTS

| | | |
|---|---|---|
| EP | 0 300 091 B1 | 1/1989 |
| EP | 1271745 A1 | 1/2003 |
| EP | 1544977 A2 | 6/2005 |
| FR | 2217844 | 10/1974 |
| WO | WO 92/04758 | 3/1992 |

* cited by examiner

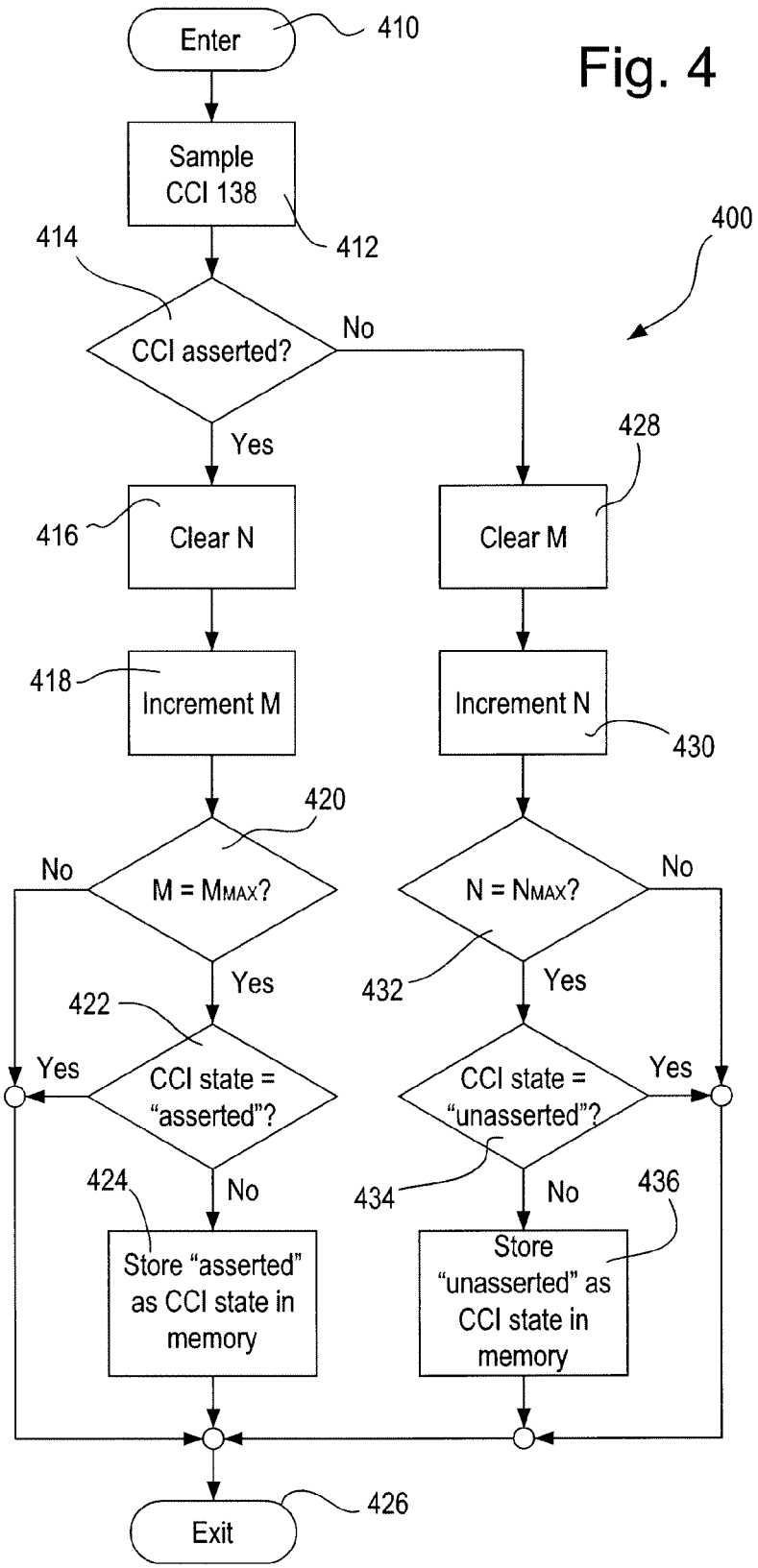

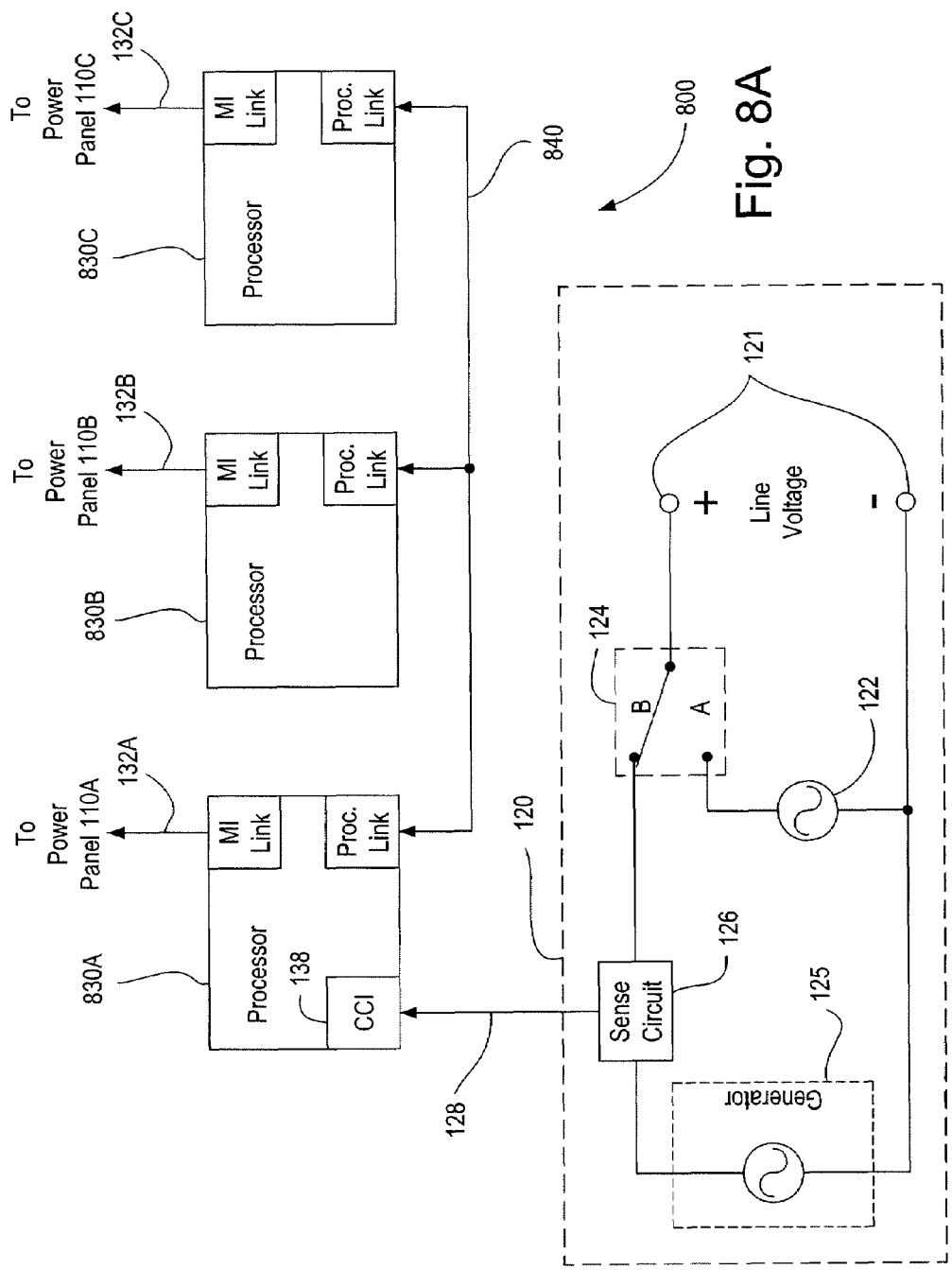

METHOD OF POWERING UP A PLURALITY OF LOADS IN SEQUENCE

RELATED APPLICATIONS

This application claims priority from commonly-assigned U.S. Provisional Application Ser. No. 60/844,602, filed Sep. 14, 2006, entitled METHOD OF STARTING UP A PLURALITY OF LOADS IN SEQUENCE, the entire disclosure of which is hereby incorporated by reference.

BACKGROUND OF THE INVENTION

The present application is related to commonly-assigned, co-pending U.S. patent applications Nos. 11/900,717 and 11/900,900, each of which was filed on Sep. 13, 2007. The entire disclosures of both applications are hereby incorporated by reference.

1. Field of the Invention

The present invention relates to a lighting control system comprising a plurality of load control devices for controlling the amount of power delivered to an electrical load from a power distribution system, and more particularly, to a lighting control system operable to power up the plurality of load control devices in a sequence to reduce stress on the power distribution system at an initial power up.

2. Description of the Related Art

Power distribution systems are often susceptible to abnormal operation in response to the current drawn from the loads connected to the power distribution system. For example, if all of the loads connected to the power distribution system power up concurrently and draw a large electrical current from the power distribution system, the magnitude and frequency of the output voltage of the power distribution system may fluctuate causing undesired responses in the operation of the loads.

The abnormal operation of a power distribution system is commonly brought about by two characteristics of the power distribution system. First, the power distribution system may have a limited peak power capability. If the power distribution system is subject to a pulse of load current having a magnitude that exceeds the peak power capability, fluctuations may occur in the output voltage of the power distribution system. For example, site supply generators have a substantially limited peak power capability as compared to utility-based generation. However, site supply generators are often used as the power distribution systems on marine vessels, such as yachts and cruise ships, and as backup power sources (i.e., in the case of a utility power outage).

Further, power distribution systems having a high source impedance are more susceptible to abnormal output performance. For example, if a residence (i.e., a utilization point) is located a long distance from an electricity generating plant (i.e., a generation point), there is typically a large impedance between the utilization point and the generation point because of the large resistance of the electrical wire between the residence and the generating plant. Accordingly, the output voltage provided to the residence by the power distribution system is more susceptible to fluctuations in the line voltage in response to changes in the load current. The type and size of transformers and conductors used in the power distribution system (such as a generator) may also contribute to a high source impedance.

A typical load of a power distribution system is a lighting control system, which may comprise a large number of lighting loads that are controlled from, for example, a plurality of load control modules located in power panels. The lighting control system may also comprise a central processor for control of the load control modules. Prior art lighting control systems have operated to turn the lighting loads on at once upon power up, i.e., when the lighting control system is energized. Typically, the lighting loads are turned on to the last lighting intensity, i.e., the lighting intensity that the lighting load was illuminated to before the power was removed from the system. A typical lighting control system is described in greater detail in U.S. Pat. No. 6,803,728, issued Oct. 12, 2004, entitled SYSTEM FOR CONTROL OF DEVICES, the entire disclosure of which is hereby incorporated by reference.

When a lighting load is first turned on, the lighting load may draw a substantially large inrush current. Accordingly, if the power distribution system powering the lighting control system is susceptible to abnormal operation as described above, the power distribution system may not be able to provide the appropriate power to start up the lighting control system when the lighting control system is energized such that all of the lighting loads turn on at once. This may occur, for example, when a backup generator powers up in response to a power outage.

Further, a situation may occur in which the output voltage of the generator fluctuates as the lighting control system and all other loads powered by the generator attempts to power up at once. When the generator first powers up, the generator produces an output voltage having a maximum magnitude. After being energized by the output voltage of the generator, the central processor of the lighting control system turns on the lighting loads. The lighting control system may then draw a substantially large inrush current from the generator. If the generator is not able to provide the amount of current required by the large inrush current, the output voltage of the generator decreases in magnitude. If the output voltage of the generator drops to a magnitude that is too low to power the lighting control system (i.e., a magnitude at which the internal power supplies of the components of the lighting control system drop out), the lighting control system turns all of the lighting loads off and stops drawing a significant amount of current from the power distribution system. Since the generator is no longer overloaded, the output voltage of the generator increases in magnitude. Accordingly, the lighting control system powers up, thus, turning all of the lighting loads on again, and the cycle repeats.

Therefore, there is a need for a lighting control system that is operable to start up without over-stressing a power distribution system with a limited peak power capability or a high source impedance.

SUMMARY OF THE INVENTION

According to the present invention, a method of controlling the amount of power delivered to a plurality of electrical loads from a power distribution system in order to prevent abnormal operation of the power distribution system is provided. The method comprises the step of sequentially powering up each of the plurality of loads. Preferably, the step of sequentially powering up each of the plurality of loads comprises powering up a first one of the plurality of loads at a first time, and powering up a second one of the plurality of loads at a second time different than the first time. The method may further comprise the steps of providing a control signal from the power distribution system in response to the power distribution system stabilizing, and sequentially powering up each of the plurality of loads at predetermined times in response to the step of providing a control signal.

In addition, the present invention provides a load control system for controlling the amount of power delivered to a plurality of electrical loads from a power distribution system. The load control system comprises a plurality of load control devices. Each load control device is coupled to one of the plurality of electrical loads. The load control devices are operable to turn on each of the electrical loads in sequence in response to the AC power source powering up to prevent abnormal operation of the power distribution system.

Other features and advantages of the present invention will become apparent from the following description of the invention that refers to the accompanying drawings.

BRIEF DESCRIPTION OF THE DRAWINGS

FIG. 4 is a simplified flowchart of a CCI procedure executed by a central processor of the lighting control system of FIG. 1;

FIG. 8A is a simplified block diagram of a centralized lighting control system according to a second embodiment of the present invention;

DETAILED DESCRIPTION OF THE INVENTION

Figure 1:
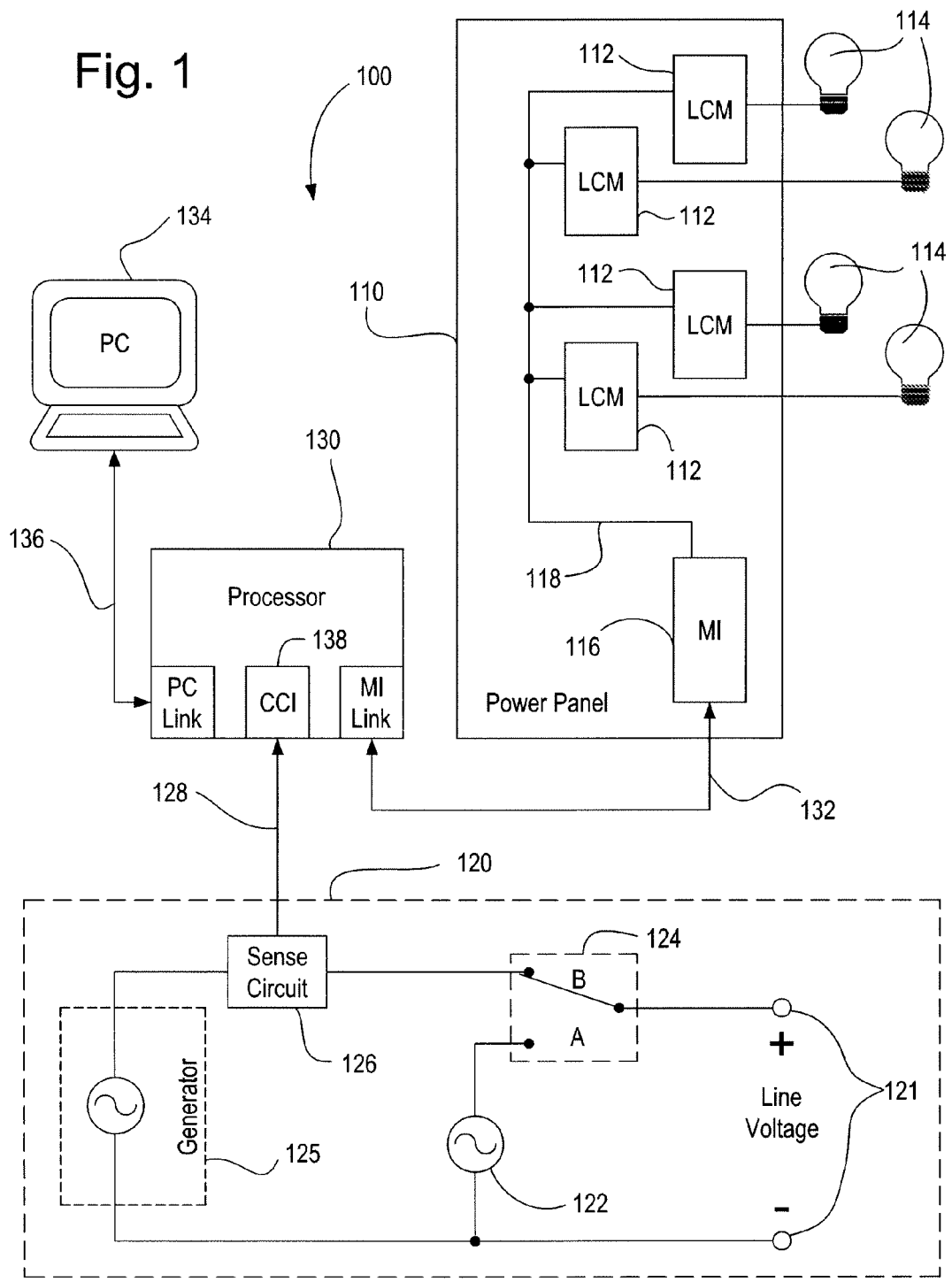
FIG. 1 is a simplified block diagram of a centralized lighting control system according to a first embodiment of the present invention.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

FIG. 1 is a simplified block diagram of a centralized lighting control system 100 according to a first embodiment of the present invention. The lighting control system comprises a power panel 110 having a plurality of load control modules (LCMs) 112 (i.e., a load control device). Each load control module 112 is coupled to a lighting load 114 for control of the amount of power delivered to the lighting load. Alternatively, each load control module 112 may be coupled to more than one lighting load 114, for example, four lighting loads, for individually controlling the amount of power delivered to each of the lighting loads. The power panel 110 also comprises a module interface (MI) 116, which controls the operation of the load control modules 112 via digital signals transmitted across a power module control link 118.

A power distribution system 120 provides an output voltage (i.e., a line voltage, such as 120 V, 60 Hz) to the load control modules 112 via two line voltage connections 121. While not shown in FIG. 1, each load control module 112 directly receives the output voltage from the power distribution system 120. The power distribution system 120 comprises a first power source 122 (e.g., an external power generating plant), a transfer switch 124, and an on-site supply generator 125. The transfer switch 124 is typically in position A, such that the lighting control system 100 is powered by the first power source 122 in normal operation. However, in the event of a power outage, i.e., if the first power source 122 cannot supply power to the lighting control system 100, the transfer switch 124 changes to position B, such that the generator 125 powers the lighting control system. Since the generator 125 may have a limited peak power capability and a high source impedance, the generator 125 may be susceptible to abnormal operation in response to large pulses of load current drawn by the lighting control system 100.

The power distribution system 120 further comprises a sense circuit 126 for generating a power system output signal, e.g., a contact closure output (CCO) signal 128. The contact closure output signal 128 is generated by a suitable switching device (not shown) in the sense circuit 126, such as, for example, a relay or a transistor. The switching device has two states (i.e., open or closed), such that the contact closure output signal 128 is asserted by closing the switching device, i.e., electrically connecting the two terminals of the switching device. Preferably, the contact closure output signal 128 is asserted (i.e., closed) when the output voltage of the generator 125 is stable, i.e., not fluctuating, and is not asserted (i.e., open) when the output voltage of the generator 125 is not stable. Alternatively, the contact closure output signal 128 may be asserted when the output voltage of the generator 125 is not stable. Further, the power system output signal may comprise any suitable control signal rather than the contact closure output signal 128.

The lighting control system 100 further comprises a central processor 130, which controls the operation of the lighting control system, specifically, the amount of power delivered to the lighting loads 114 by the load control modules 112. The central processor 130 is operable to communicate with the module interface 116 of the power panel 110 via an MI link 132. Accordingly, the module interface 116 is operable to cause the load control modules 112 to turn off and on and to control the intensity of the lighting loads 114 in response to digital signals received by the module interface 116 from the central processor 130.

Figure 2:
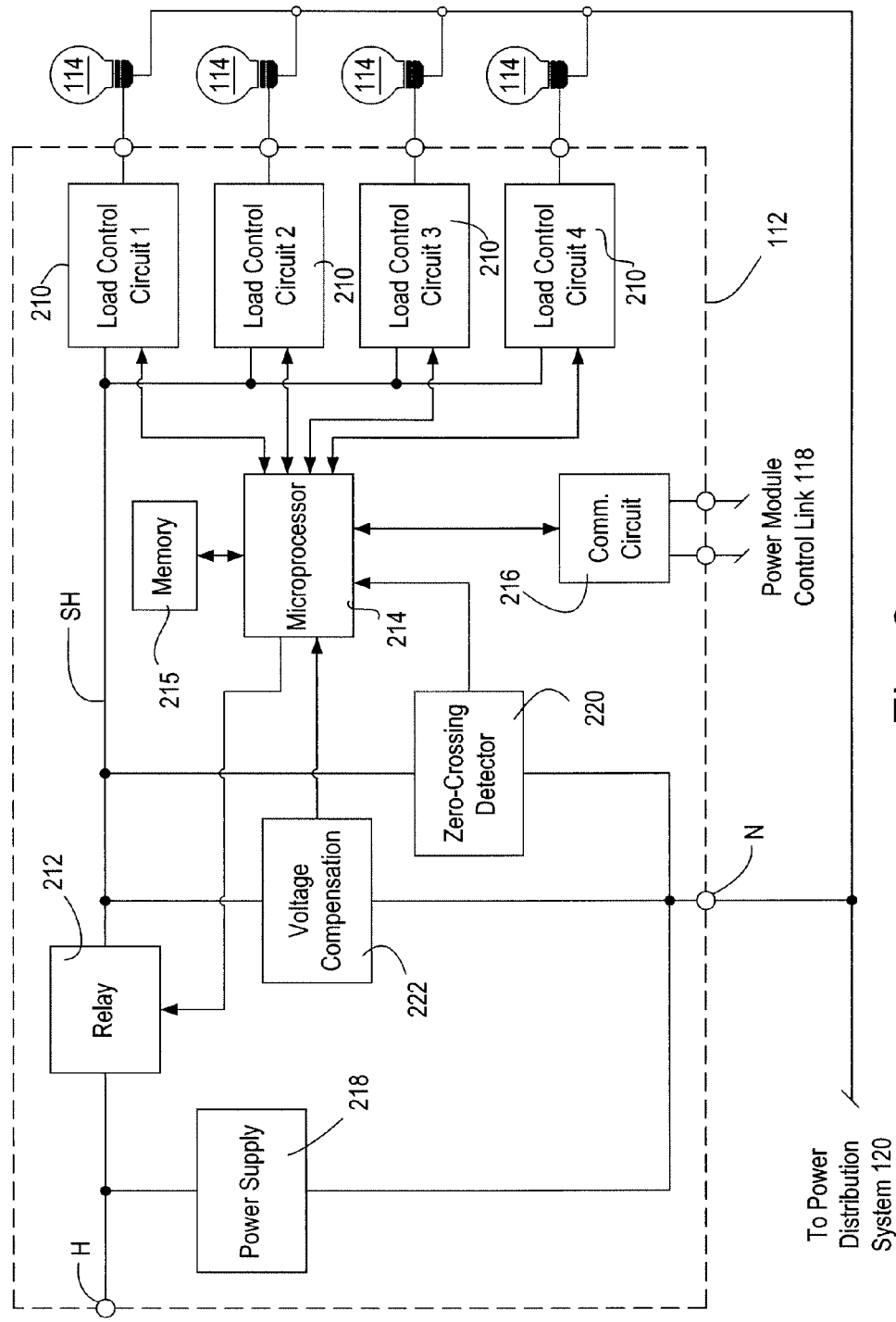
FIG. 2 is a simplified block diagram of the lighting control module of the lighting control system of FIG. 1.

FIG. 2 is a simplified block diagram of the lighting control module 112. The lighting control module 112, as shown in FIG. 2, comprises four load control circuits 210. Each load control circuit 210 is coupled to a lighting load 114 for control of the intensity of the lighting load. The load control module 112 is coupled to the line voltage connections 121 of the power distribution system 120 via a hot terminal H and a neutral terminal N. An air-gap switch, e.g., a relay 212, is coupled to the hot terminal H to provide a switched hot voltage SH for the load control circuits 210. The load control circuits 210 and the relay 212 are controlled by a microprocessor 214. The microprocessor 214 may be any suitable controller, such as a programmable logic device (PLD), a microcontroller, or an application specific integrated circuit (ASIC). The microprocessor 214 is coupled to a non-volatile memory 215 for storage of data regarding the operation of the lighting control module 112.

The load control module 112 is coupled to the power module control link 118 to receive digital control signals from the module interface 116 via a communication circuit 216. The communication circuit 216 is coupled to the microprocessor 214, such that the microprocessor is operable to control the load control circuits 210 in response to the digital control signals transmitted by the module interface 116. A power supply 218 is coupled between the hot terminal H and the neutral terminal N and generates a direct-current (DC) voltage $V_{CC}$ for powering the microprocessor 214, the communication circuit 216, and the other low-voltage circuitry of the load control module 112.

Each load control circuit 210 uses one or more controllably conductive devices (not shown), for example, relays or bidirectional semiconductor switches, such as triacs or field-effect transistors (FETs), to control the amount of power delivered to the lighting load 114. The controllably conductive device is coupled in series between the switched hot voltage SH and the lighting load 114. Using a phase-control dimming technique, the microprocessor 214 causes the load control circuit 210 to render the controllably conductive device conductive for a portion of each half-cycle to provide power to the lighting load 114, and to render the controllably conductive device non-conductive for the other portion of the half-cycle to disconnect power from the load 114. In forward phase-control dimming, the controllably conductive device is conductive at the end of each half-cycle. Alternatively, in reverse-phase control dimming, the controllably conductive device is conductive at the beginning of each half-cycle.

A zero-crossing detector 220 determines the zero-crossings of the line voltage of the power distribution system 120. A zero-crossing is defined as the time at which the line voltage transitions from positive to negative polarity, or from negative to positive polarity, at the beginning of each half-cycle. The zero-crossing information is provided as an input to the microprocessor 214. The microprocessor 214 controls the controllably conductive devices of the load control circuits 210 to provide line voltage to the lighting loads 114 at predetermined times relative to the zero-crossing points of the AC waveform using the standard phase-control dimming techniques.

Since the generator 125 may produce some amount of noise on the line voltage of the power distribution system 120, the zero-crossing detector 220 preferably includes an active filter for receiving the line voltage, and for recovering the AC fundamental waveform. The recovered AC fundamental is preferably substantially free of noise or distortion, and of frequency components greater than at least second order harmonics, that may be present on the line voltage of the power distribution system 100, and that might otherwise result in faulty or incorrect zero crossing detection. The filter may take an analog or digital (software) form and is described in greater detail in commonly-assigned U.S. Pat. No. 6,091,205, issued Jul. 18, 2000, and commonly-assigned U.S. Pat. No. 6,380,692, issued Apr. 30, 2002, both entitled PHASE CONTROLLED DIMMING SYSTEM WITH ACTIVE FILTER FOR PREVENTING FLICKERING AND UNDESIRED INTENSITY CHANGES. The entire disclosures of both patents are hereby incorporated by reference.

The lighting control module 112 may optionally comprise a voltage compensation circuit 222. The voltage compensation circuit 222 is operable to integrate a signal representative of a square of an amplitude of the electrical waveform to produce a signal representative of the energy delivered to the lighting load 114 so far in the present half-cycle. If reverse phase-control dimming is being used, the microprocessor 214 may use the signal generated by the voltage compensation circuit 222 to control the load control circuit 210 in response to the energy delivered to the lighting loads 114. The voltage compensation circuit 222 is described in greater detail in commonly-assigned co-pending U.S. patent application Ser. No. 10/865,083, filed Jun. 10, 2004, entitled APPARATUS AND METHODS FOR REGULATING DELIVERY OF ELECTRICAL ENERGY, the entire disclosure of which is hereby incorporated by reference.

Referring back to FIG. 1, the central processor 130 may also be coupled to a personal computer (PC) 134 via a PC link 136. The PC 134 executes a graphical user interface (GUI) software that allows a user of the lighting control system 100 to setup and monitor the lighting control system. Typically, the GUI software creates a database defining the operation of the lighting control system 100 and the database is downloaded to the central processor 130 via the PC link 136. The central processor 130 comprises a non-volatile memory for storing the database.

The central processor 130 comprises a contact closure input (CCI) 138 for receipt of the contact closure output signal 128 from the sense circuit 126 of the power distribution system 120. The contact closure output signal 128 is representative of the output voltage of the generator 125 stabilizing. Alternatively, the CCI 138 could be included as part of an external device, such as, for example, a contact closure input device coupled to the central processor 130 via a communication link, such that the contact closure input device is operable to transmit a digital signal to the central processor in response to contact closure output signal 128.

According to the present invention, the central processor 130 is operable to startup the lighting loads 114 in a sequence (i.e., a startup sequence) when the contact closure output signal 128 is asserted (corresponding to the output voltage of the generator 125 stabilizing) within a first predetermined amount of time $T_1$ after powering up. When the lighting control modules 110 are in a startup-delay mode, the lighting control modules do not power up the connected lighting loads 114 immediately upon power up, but waits for a second predetermined amount of time $T_2$ to receive a command from the central processor 130.

Using the GUI software executed by the PC 134, the user can enable the startup sequence, such that the lighting control system 100 is operable to respond to the contact closure output signal 128. The user may also program a schedule defining the startup sequence into the database of the lighting control system 100 using the GUI software. When the database is downloaded from the PC 134 to the central processor 130, the central processor 130 saves the events of the startup sequence in memory and transmits an appropriate startup-delay configuration signal to the module interface 116 via the MI link 132. In response, the module interface 116 causes the lighting control modules 112 to set a startup-delay mode bit in the memory of the microprocessor 214 to designate that the lighting control module 112 is in the startup-delay mode.

When the central processor 130 is powered up and the startup sequence in enabled, the central processor waits (for the first predetermined amount of time $T_1$) for the contact closure signal 128 to be asserted. The contact closure output signal 128 is asserted in response to the sense circuit 126 determining that the output voltage of the generator 125 has stabilized. If the contact closure output signal 128 is asserted before the central processor 130 powers up, or after the central processor powers up, but before the first predetermined period of time $T_1$ expires, the startup sequence is started by the central processor. Upon determining that the contact closure output signal 128 is asserted, the central processor 130 immediately begins controlling all of the lighting loads 114 off, i.e., the central processor does not turn any of the lighting loads on. Then, at the event times of the startup sequence, the central processor 130 controls each of the lighting loads 114 on. The startup sequence may be programmed such that the lighting loads 114 are turned on one by one. The startup sequence may also be programmed such that the lighting loads 114 are turned on in groups, for example, on a panel-by-panel basis. Preferably, emergency or necessary lighting may be turned on prior to turning on non-essential lighting.

If the contact closure output signal 128 is not asserted by the sense circuit 126 before the first predetermined period of time $T_1$ expires, the central processor 130 controls the lighting loads 114 as in normal operation, i.e., to the predetermined values determined by the database.

When the lighting control module 112 is powered up in the startup-delay mode, the lighting control module does not immediately turn the lighting loads 114 on, but waits for the second predetermined amount of time $T_2$ to receive a command from the central processor 130. If the lighting control module receives a command from the central processor 130 to turn off the lighting loads 114, e.g., if the startup sequence has been started, the lighting control module 112 does not turn on the lighting loads 114, but waits for another command corresponding to an event of the startup sequence. After receiving a startup sequence event, the lighting control module 112 turns the lighting loads 114 on. If the lighting control module does not receive a command from the central processor 130 before the second predetermined amount of time $T_2$ expires, the lighting control module 112 resumes normal operation, for example, by controlling the lighting loads 114 to the last known level as stored in the memory 215.

Figure 3A:
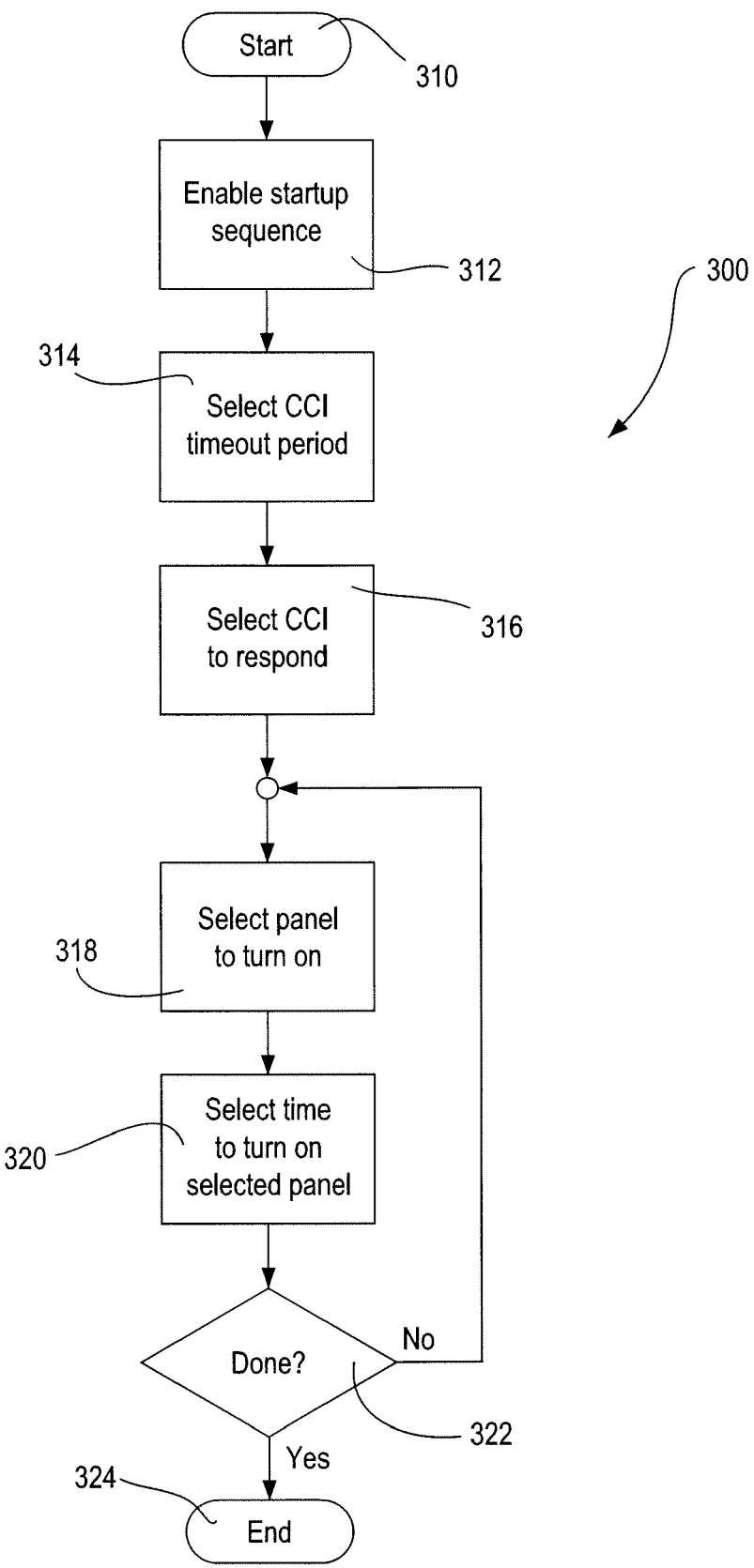
FIG. 3A is a simplified flowchart of an example of a startup sequence configuration procedure executed by a user of the GUI software of a PC of the lighting control system of FIG. 1.
Figure 3B:
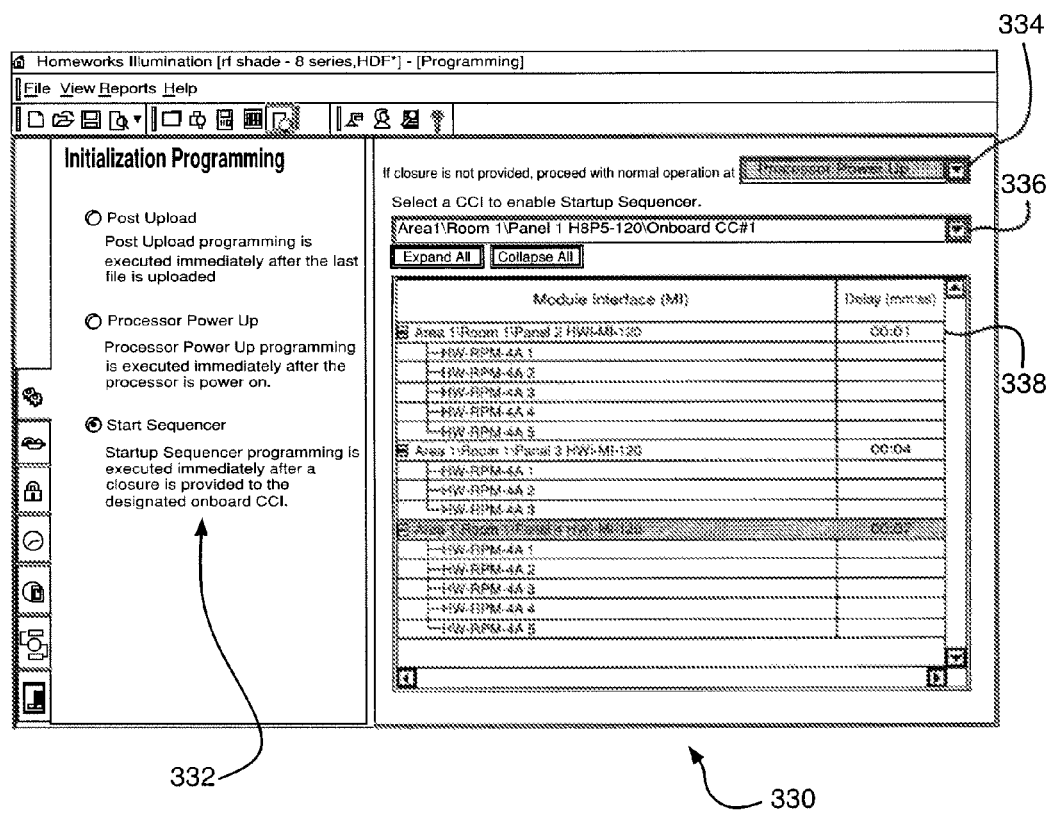
FIG. 3B is an example screen shot of a startup sequence configuration screen of the startup sequence configuration procedure of FIG. 3A.

FIG. 3A is a simplified flowchart of an example of a startup sequence configuration procedure 300 executed by a user of the GUI software on the PC 134 to configure the startup sequence. FIG. 3B is an example screen shot of a startup sequence configuration screen 330 of the GUI software. If the user desires to use the startup sequence, i.e., if the lighting control system 100 is powered from a power distribution system that is susceptible to abnormal operation, such as a generator, the user can access the startup sequence configuration screen 330 through the GUI to determine when the lighting loads 114 turn on during the startup sequence.

The startup sequence configuration procedure 300 begins at step 310 and the user enables the startup sequence at step 312, for example, by selecting the startup sequence option 332 of the startup sequence configuration screen 330. At step 314, the user is operable to select the CCI timeout period, i.e., the first predetermined time for which the central processor 130 waits for the contact closure output signal 128 after powering up and before entering normal operation. The user may select the CCI timeout period from a number of times in a first pull-down menu 334 of the startup sequence configuration screen 330. For example, the choices may range from one second to nine seconds at one second increments, and may also include a "Processor Power Up" selection, which corresponds to a time of zero seconds. If the lighting control system 100 includes more than one contact closure input, the user is operable to select which contact closure input is responsive to the contact closure output signal 128 at step 316. For example, the user may select the CCI 138 of the central processor 130 using a second pull-down menu 336 of the startup sequence configuration screen 330.

Next, the user is operable to enter the events of the startup sequence, i.e., the times at which the lighting loads 114 turn on after the generator 125 has stabilized. In the example screenshot shown in FIG. 3B, the user is operable to select which lighting loads 114 turn on a panel-by-panel basis. At step 318, the user is operable to select a power panel 110 by highlighting a power panel selection bar 338 of the startup sequence configuration screen 330. At step 320, the user is then operable to enter a delay time (i.e., the time at which the power panel 110 will turn on all lighting loads 114 after the contact closure output signal 128 is asserted) by entering a time in minutes and seconds into the right end of the power panel selection bar 338. If the user has not completed configuring the startup sequence at step 322, the user repeats steps 318 and 320. When the user is done at step 322, the startup sequence configuration procedure 300 ends at step 324.

The flowchart of FIG. 3A is provided as an example of the startup sequence procedure 300. One skilled in the art will recognize that the steps of the startup sequence configuration procedure 300 using the startup sequence configuration screen 330 of the GUI software could be executed in a different order than shown in FIG. 3A. Further, the user could alternatively enter a delay time for each of the lighting control modules 112 (listed below each of the power panels 110 on the startup sequence configuration screen 330) or even each of the individual lighting loads 114 connected to each of the lighting control modules 112.

FIG. 4 is a simplified flowchart of a CCI procedure 400 executed by the central processor 130 to enable the central processor to determine if the contact closure output signal 128 is asserted. The central processor 130 maintains a CCI state as "asserted" or "unasserted" in the non-volatile memory. The CCI procedure 400 is preferably executed periodically, e.g., approximately every 10 msec, and begins at step 410. At step 412, the central processor 130 samples the contact closure output signal 128, preferably using a standard de-bouncing technique, e.g., an external hardware filter or a software filter. The central processor 130 uses two variables M, N to count the number of consecutive samples of the contact closure output signal 128 that are asserted or unasserted, respectively. Preferably, the central processor 130 must receive two equal consecutive samples in order to change the CCI state of the CCI 138.

If the central processor 130 determines that the contact closure output signal 128 is asserted at step 414, the variable N is cleared at step 416 and the variable M is incremented at step 418. If the variable M is equal to a maximum value $M_{MAX}$, e.g., two (2), at step 420 and the CCI state stored in the memory is not "asserted" at step 422, the central processor 130 stores "asserted" as the CCI state in the memory at step 424. If the variable M is not equal to the maximum value $M_{MAX}$ at step 420 or the CCI state is already set to "asserted" at step 422, the CCI procedure 400 simply exits at step 426.

If the central processor 130 determines that the contact closure output signal 128 is unasserted at step 414, the central processor clears the variable M at step 428 and increments the variable N at step 430. If the variable N is equal to a maximum value $N_{MAX}$, e.g., two (2), at step 432 and the CCI state is not "unasserted" at step 434, the central processor 130 sets the CCI state as "unasserted" in the memory at step 436. If the variable N is not equal to the maximum value $N_{MAX}$ at step 432 or the CCI state is "unasserted" at step 434, the CCI procedure 400 exits at step 426.

Figure 5:
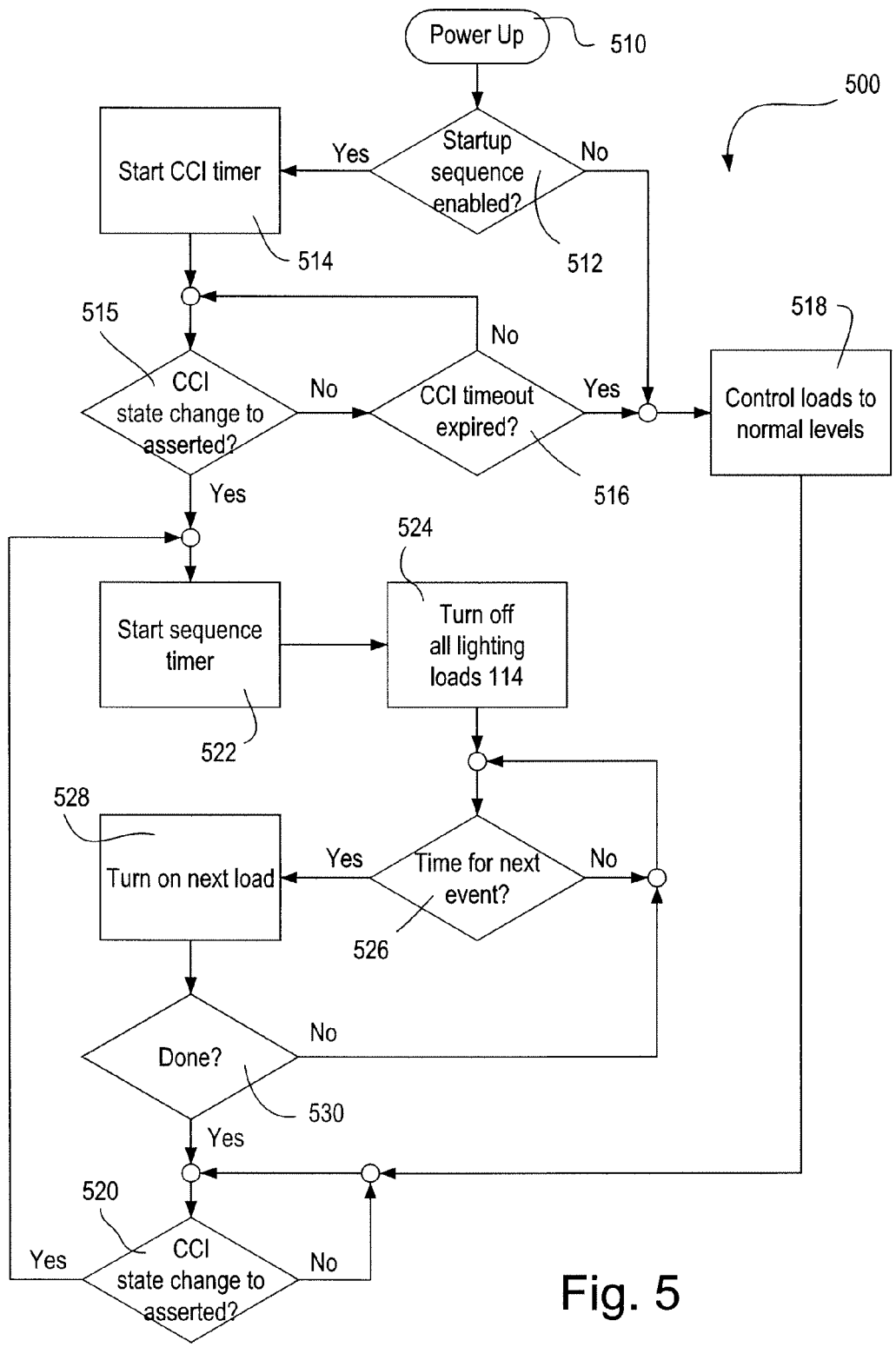
FIG. 5 is a simplified flowchart of a startup procedure executed by the central processor of the lighting control system of FIG. 1.

FIG. 5 is a simplified flowchart of a startup procedure 500 executed by the central processor 130 upon power up, i.e., when power is first applied to central processor 130, at step 510. If the startup sequence is not enabled at step 512, the central processor 130 simply transmits a control signal to the module interface 116 to control the lighting loads 114 to the normal levels, i.e., according to the database, at step 518. Otherwise, a CCI timer is initialized to a maximum timer value $T_{MAX}$ (corresponding to the first predetermined amount of time $T_1$) and starts decreasing in value with time at step 514. The central processor 130 uses the CCI timer to determine if the contact closure output signal 128 is asserted before the first predetermined time $T_1$ has expired since power up.

The central processor 130 monitors the contact closure output signal 128 to determine when the contact closure output signal changes from being unasserted (i.e., open) to asserted (i.e., closed). Specifically, if the central processor 130 determines that the CCI state (from the CCI procedure 400) has changed to "asserted" at step 515, the central processor 130 begins the startup sequence. When the contact closure output signal 128 is asserted before the central processor 130 powers up, the central processor can determine that the CCI state has changed to "asserted" at step 515 (since the previous CCI state is stored in the memory) and immediately begin the startup sequence.

If the central processor 130 determines that CCI state has not changed to "asserted" at step 515, the startup procedure 500 loops until the CCI state has changed to "asserted" at step 515 or the CCI timer has expired at step 516. If the CCI timer expires at step 516, the lighting loads 114 are controlled to the normal levels at step 518, and the microprocessor 214 waits again for the contact closure output signal 128 to be asserted at step 520.

When the contact closure output signal 128 has been asserted at step 515 or at step 520, a sequence timer is started at step 522. The sequence timer increases in value with time and is used to determine when the events of the startup sequence occur. At step 524, the central processor 130 transmits a control signal to the module interface 116 to turn off all of the lighting loads 114. Next, the procedure 500 loops until the sequence timer reaches the time for the next event of the startup sequencer at step 526. At this time, the central processor 130 causes the appropriate lighting loads 114 to turn on by transmitting control signals to the module interface 116 at step 528. If the startup sequence is not complete at step 530, the central processor 130 waits for the next event at step 526.

When the startup sequence is done at step 530, the microprocessor 214 waits again for the contact closure output signal 128 to be asserted at step 520. For example, the CCI state may be changed to "asserted" at step 520 if the contact closure output signal 128 is not asserted before the CCI timeout expires at step 156, but is asserted after the lighting loads 114 are controlled to the normal levels at step 518. Also, the CCI state may be changed to "asserted" at step 520 after completing the startup sequence if the contact closure output signal 128 is unasserted and then asserted again. If the central processor 130 determines that the CCI state has changed to "asserted" at step 520, the procedure 500 loops around to begin the startup sequence.

Figure 6:
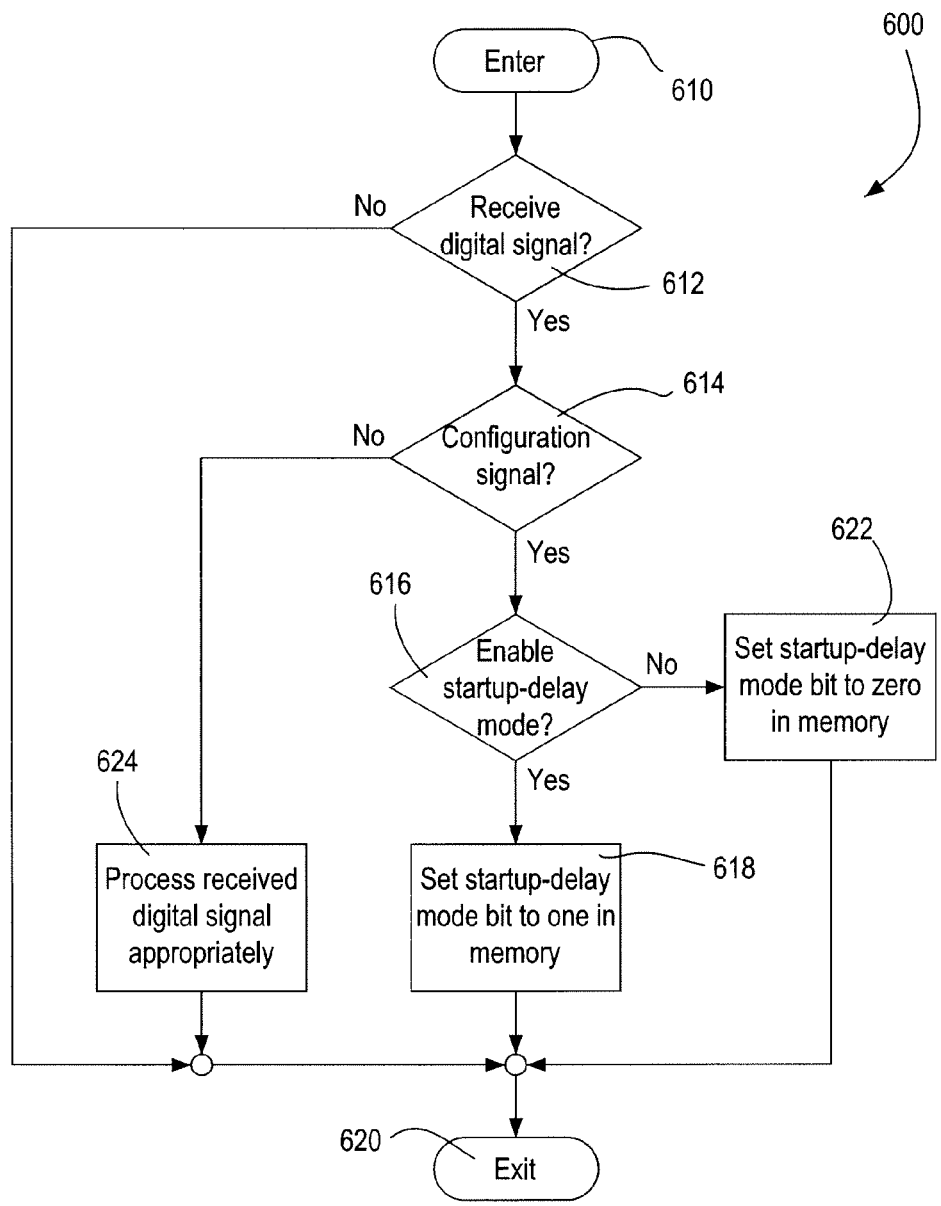
FIG. 6 is a simplified flowchart of a communication procedure executed by a microprocessor of the lighting control module of FIG. 2.

FIG. 6 is a simplified flowchart of a communication procedure 600, which is executed by the microprocessor 214 of the lighting control module 112. Upon receipt of a startup-delay configuration signal during the communication procedure 600, the microprocessor 214 causes the lighting control module 112 to enter the startup-delay mode. The communication procedure 400 is preferably executed periodically, e.g., every 10 msec, and begins at step 610. If the lighting control module 112 has received a digital signal at step 612, a determination is made as to whether the received digital signal is a startup-delay configuration signal at step 614. Preferably, the startup-delay configuration signal comprises, for example, eight bits of data with one bit designating the startup-delay mode. If the received communication is a startup-delay configuration signal at step 614 and the startup-delay mode is enabled in the startup-delay configuration signal at step 616, the microprocessor 214 sets the startup-delay mode bit to one in the non-volatile memory 215 at step 618 and exits at step 620. Otherwise, the startup-delay mode bit is reset to zero at step 622 and the procedure 600 exits at step 620. If the lighting control module 112 has not received a digital signal at step 612 or the received digital signal is not a startup-delay configuration signal at step 614, the communication procedure 600 simply exits without altering the startup-delay mode bit. If the digital signal is not a startup-delay configuration signal at step 614, the microprocessor 214 processes the received digital signal appropriately at step 624 and the communication procedure 600 exits at step 620.

Figure 7:
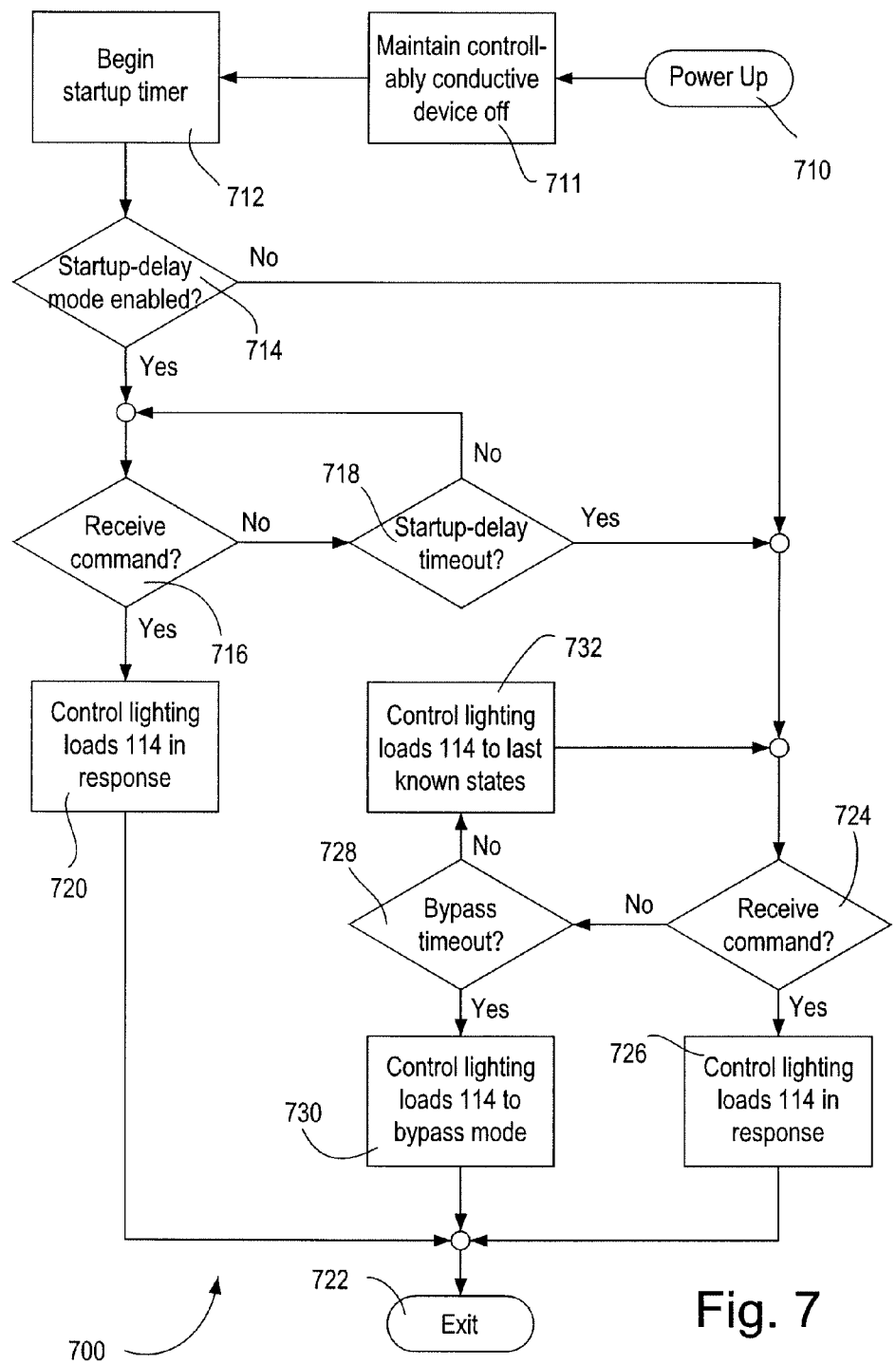
FIG. 7 is a simplified flowchart of a startup procedure executed by the microprocessor of the lighting control module of FIG. 2.

FIG. 7 is a simplified flowchart of a startup procedure 700 executed by the microprocessor 214 of the lighting control module 112. The startup procedure 700 begins upon power up, i.e., when power is first applied to the lighting control module 112, at step 710. At step 711, the microprocessor 214 maintains the controllably conductive devices of the lighting control circuits 210 non-conductive, such that the lighting loads 114 remain off. The microprocessor 214 uses a startup timer to determine how to control the lighting loads 114 during the startup procedure 700. At step 712, the startup timer is initialized to zero seconds and begins increasing in value with time.

If the startup-delay mode is enabled (i.e., the startup-delay mode bit is set to one) at step 714, a determination is made at step 716 as to whether the lighting control module 112 has received a command from the module interface 116 via the communication circuit 216 to control the lighting loads 114. If not, the procedure 700 loops until either the lighting control module 112 receives the command at step 716 or the startup timer reaches a startup-delay timeout value $T_{SD}$ at step 718. The startup-delay timeout $T_{SD}$ value preferably corresponds with the second predetermined time $T_2$ such that the microprocessor 214 waits for the second predetermined time $T_2$ before starting up the lighting loads 114 as normal. If the lighting control module 112 receives the command at step 716 (e.g., a command to turn the lighting loads 114 off if the startup sequence is enabled at the central processor 130), the lighting control module controls the lighting loads accordingly and the procedure 700 exits at step 722. At this time, the load control device 112 is operable to receive from the central processor 130 a command corresponding to an event of the startup sequence.

If the startup timer reaches the startup-delay timeout value at step 718 or if the startup-delay mode is not enabled at step 714, a determination is made at step 724 as to whether the lighting control module 112 has received a digital signal containing a lighting intensity command. If so, the microprocessor 214 controls the lighting loads 114 in response to the lighting intensity command at step 726, and the procedure 700 exits at step 720. If the lighting control module 112 has not received a digital signal containing a lighting intensity command at step 724, but the startup timer has reached a bypass timeout value at step 728, the microprocessor 214 controls the lighting loads to full intensity (e.g., 100%) at step 730, and the procedure 700 exits at step 720. Otherwise, the microprocessor 214 controls the lighting loads 114 to the last known intensities at step 732. The procedure 700 loops until the lighting control module 112 receives a command at step 724 or the startup timer reaches the bypass timeout value at step 728.

FIG. 8A is a simplified block diagram of a lighting control system 800 according to a second embodiment of the present invention. The lighting control system 800 includes three central processors 830A, 830B, 830C, which are all connected to an interprocessor communication link 840 to allow for the transmission of digital messages (i.e., digital signals) between the central processors. Only one of the central processors (i.e., the first central processor 830A) includes the CCI 138 for receipt of the contact closure output signal 128 from the sense circuit 126 of the power distribution system 120. Upon detecting that the contact closure output signal 128 has been asserted, the first central processor 830A transmits a digital message representative of the CCI event (i.e., a "CCI status message") to the other central processors 830B, 830C via the interprocessor communication link 840. Thus, to begin the startup sequence, the second and third central processors 830B, 830C do not respond to the contact closure output signal 128, but instead respond to the CCI status message transmitted by the first central processor 830A.

Figure 8B:
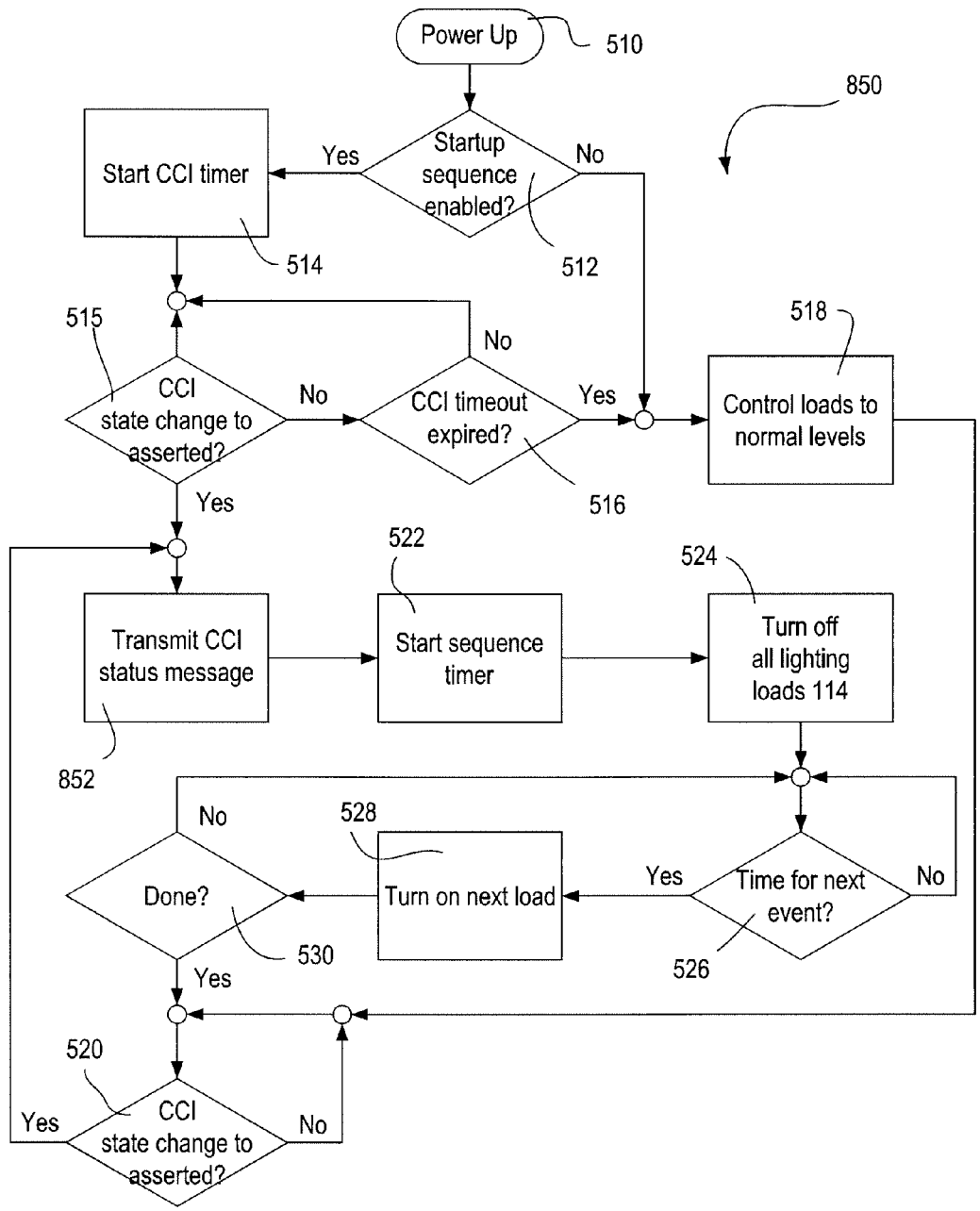
FIG. 8B is a simplified flowchart of a first startup procedure executed upon power up by a first central processor of the lighting control system of FIG. 8A.

FIG. 8B is a simplified flowchart of a first startup procedure 850 executed upon power up by the first central processor 830A, which receives the contact closure output signal 128. The startup procedure 850 is very similar to the startup procedure 500 according to the first embodiment of the present invention (as shown in FIG. 5). However, when the central processor 830A determines that the CCI state has changed to asserted at step 515 or step 520, the central processor 830A first transmits the CCI status message to the other central processors 830B, 830C at step 852, before executing the events of the startup procedure at steps 522-530.

Figure 8C:
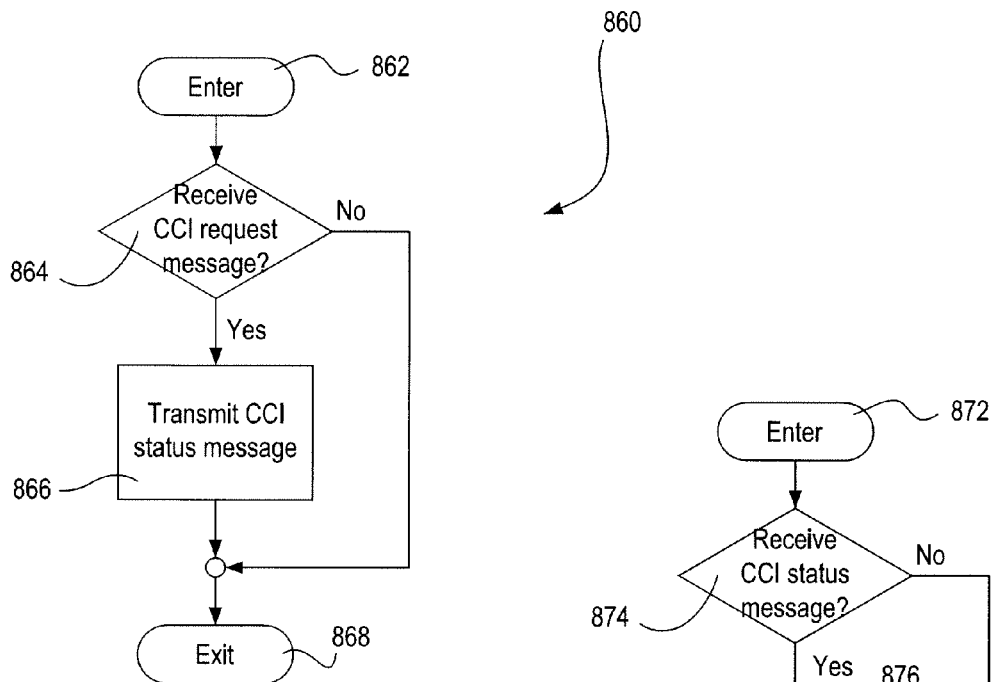
FIG. 8C is a simplified flowchart of a first communication procedure executed periodically by the first central processor of the lighting control system of FIG. 8A.

The second and third central processors 830B, 830C are operable to request the CCI status by transmitting a CCI request message to the first central processor 830A if the startup sequence is enabled as will be described in greater detail below with reference to FIG. 8E. Therefore, if the second and third central processors 830B, 830C power up after the first central processor 830A transmits the CCI status message at step 852 of the startup procedure 850 of FIG. 8B, the second and third central processors 830B, 830C are operable to request that the first central processor 830A retransmit the CCI status message. FIG. 8C is a simplified flowchart of a first communication procedure 860, which is preferably executed periodically by the first central processor 830A, e.g., every 10 msec, and begins at step 862. If the first central processor 830A receives a CCI request message at step 864, the first central processor 830A transmits the CCI status message to the second and third central processors 830B, 830C via the interprocessor communication link 840 at step 868, and the procedure 860 exits at step 868.

Figure 8D:
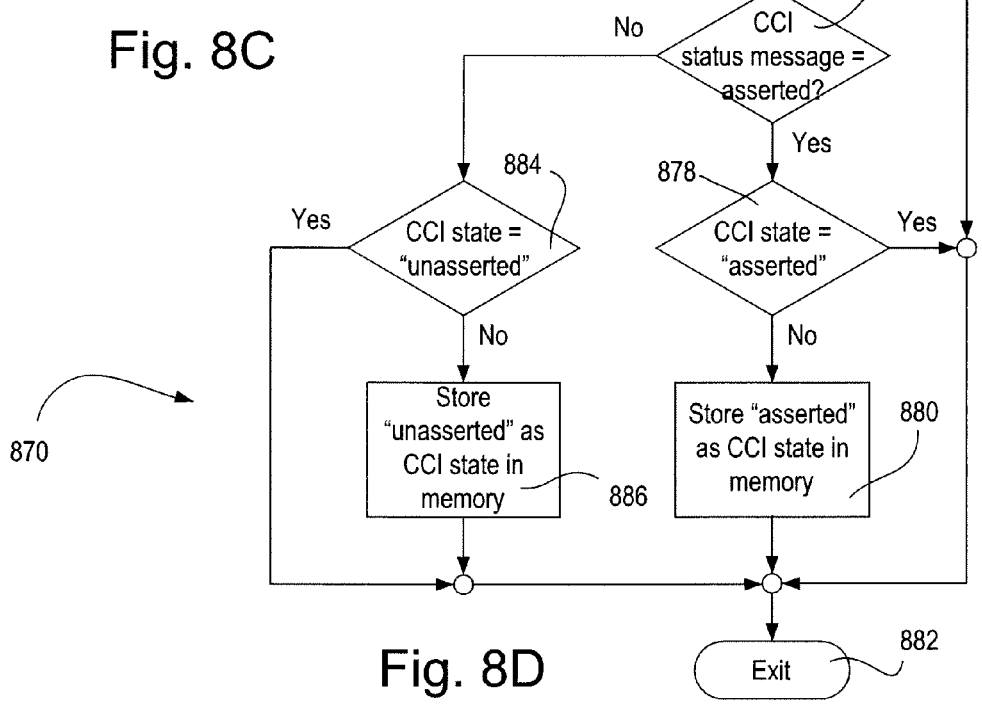
FIG. 8D is a simplified flowchart of a second communication procedure executed periodically by central processors other than the first central processor of the lighting control system of FIG. 8A.

The second and third central processors 830B, 830C maintain the CCI state in the non-volatile memory in response to the CCI status messages received from the first central processor 830A. FIG. 8D is a simplified flowchart of a second communication procedure 870, which is preferably executed periodically by each of the second and third central processors 830B, 830C, e.g., every 10 msec, and begins at step 872. If a CCI status message is received at step 874, and the CCI status contained in the CCI status message is "asserted" at step 876, a determination is made at step 878 as to whether, the CCI state stored in the memory is "asserted". If not, the CCI state is set to "asserted" in the memory at step 880, and the procedure 870 exits at step 882. If the CCI status contained in the CCI status message is "unasserted" at step 876, and the CCI state stored in the memory is not "unasserted" at step 884, the CCI state is set to "unasserted" in the memory at step 886. If the CCI state is "asserted" at step 878 or "unasserted" at step 884, the procedure 870 simply exits at step 882.

Figure 8E:
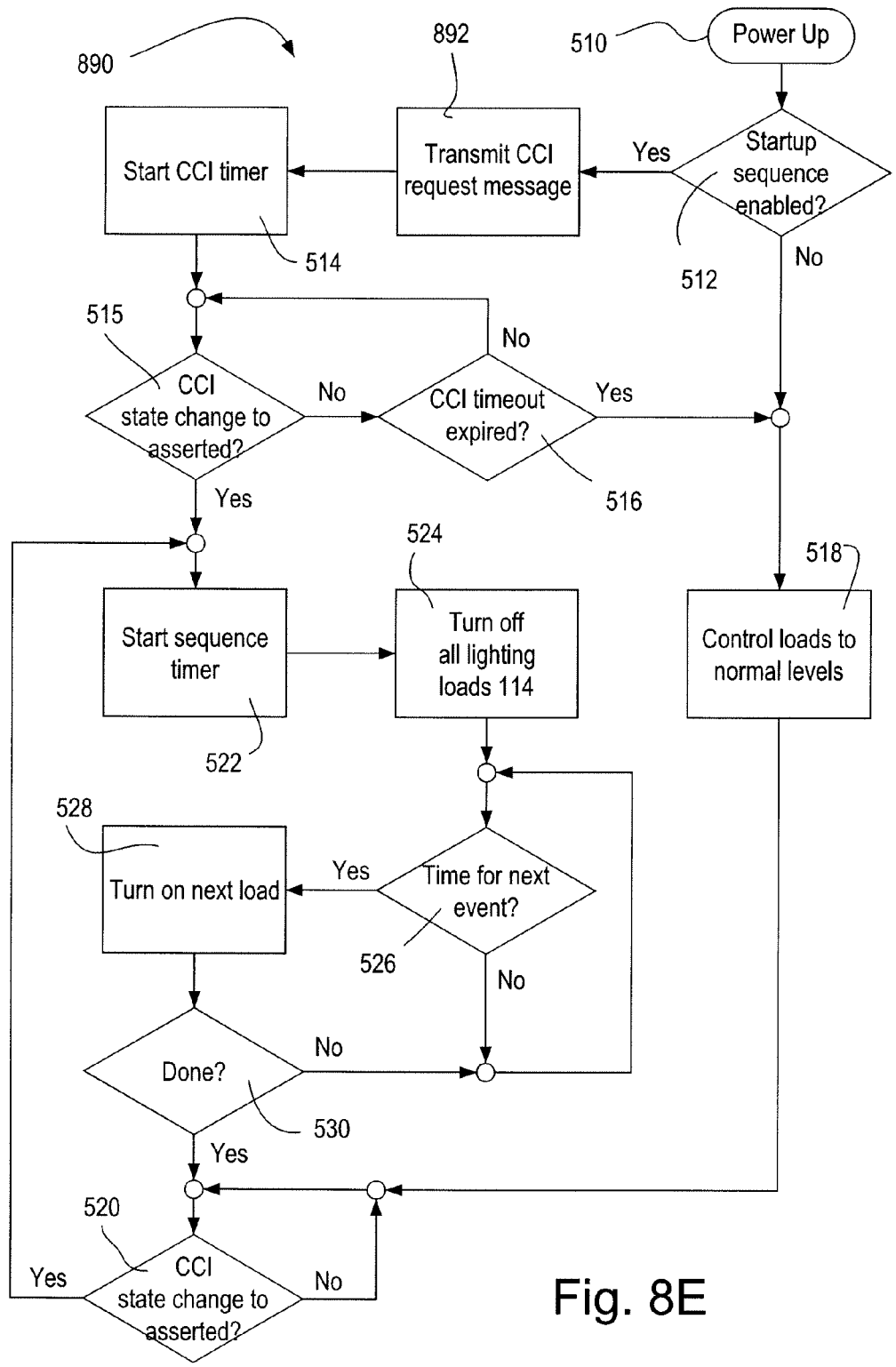
FIG. 8E is a simplified flowchart of a second startup procedure executed upon power up by the central processors other than the first central processor of the lighting control system of FIG. 8A.

FIG. 8E is a simplified flowchart of a second startup procedure 890 executed by the first and second central processors 830B, 830C upon power up. The second startup procedure 890 is also very similar to the startup procedure 500 of the first embodiment of the present invention (as shown in FIG. 5). However, immediately upon power up, the second and third central processors 830B, 830C transmit a CCI request message across the interprocessor communication link 840 at step 892 if the startup sequence is enabled at step 512. As previously mentioned, if the second and third central processors 830B, 830C power up after the first central processor 830A transmits the CCI status message at step 852 of the startup procedure 850 of FIG. 8B, the second and third central processors 830B, 830C request that the first central processor 830A retransmit the CCI status message by transmitting the CCI request message at step 892.

Figure 9:
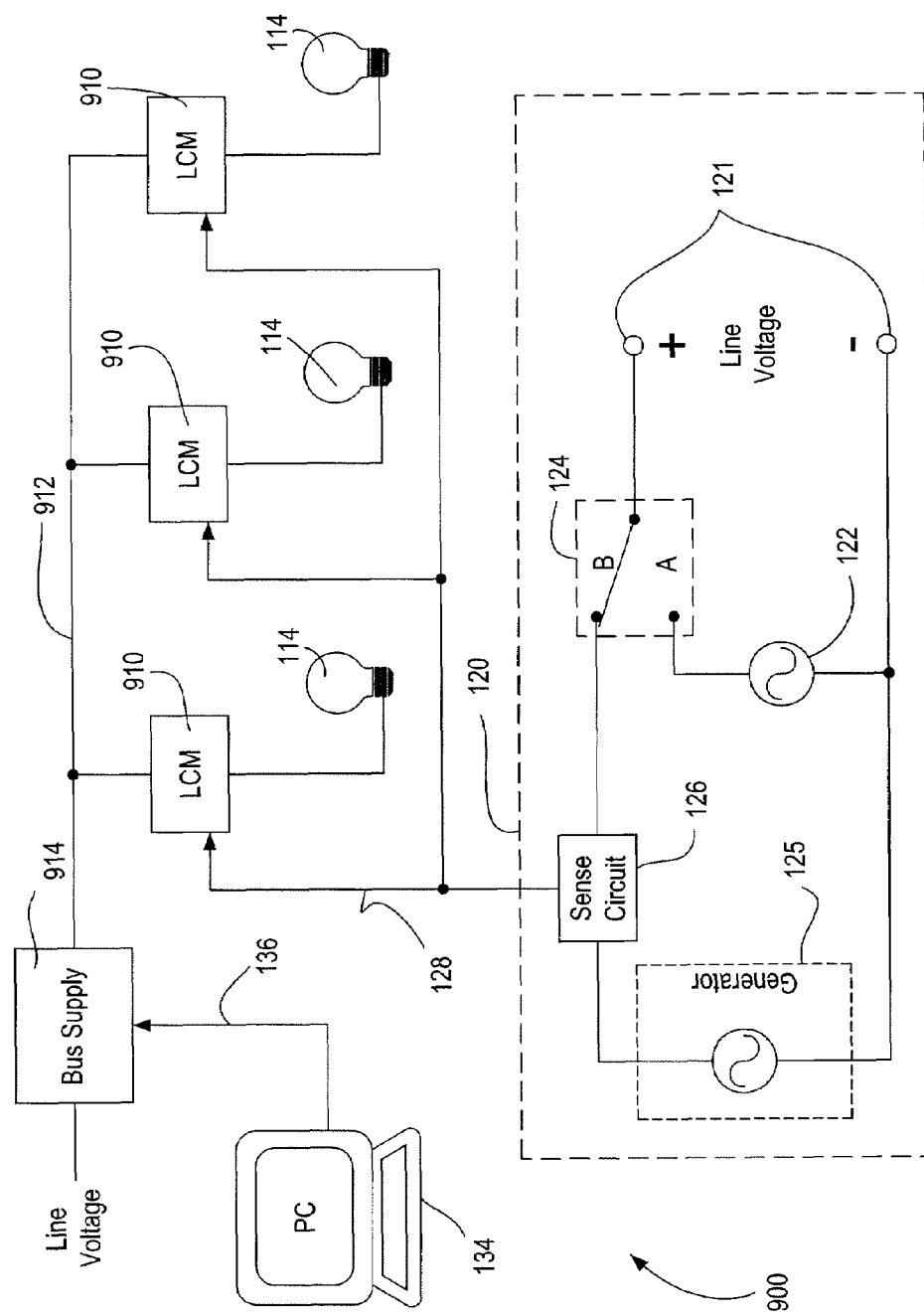
FIG. 9 is a simplified block diagram of a distributed lighting control system according to a third embodiment of the present invention.

FIG. 9 is a simplified block diagram of a distributed lighting control system 900 according to a third embodiment of the present invention. The distributed lighting control system 900 differs from the centralized lighting control system 100 (shown in FIG. 1) in that the distributed lighting control system 900 does not comprise a central processor. Further, the database defining the operation of the distributed lighting control system 900 is distributed (i.e., all or a portion of the database is stored) in each of the control devices of the distributed lighting control system.

The distributed lighting control system 900 comprises a plurality of load control modules 910, which control the lighting loads 114 and are coupled to a digital communication link 912. For example, the load control modules 910 may comprise a plurality of electronic ballasts controlling the amount of power delivered to a plurality of fluorescent lamps. Each of the load control modules 910 is coupled to the power distribution system 120 via the line voltage connections 121. The load control modules 910 are operable to communicate with each other via the digital communication link 912, which may comprise a digital addressable lighting interface (DALI) communication link. An example of a electronic ballast operable to be coupled to a digital communication link is described in greater detail in co-pending commonly-assigned U.S. patent application Ser. No. 10/824,248, filed Apr. 14, 2004, entitled MULTIPLE-INPUT ELECTRONIC BALLAST WITH PROCESSOR, and U.S. patent application Ser. No. 11/011,933, filed Dec. 14, 2004, entitled DISTRIBUTED INTELLIGENCE BALLAST SYSTEM AND EXTENDED LIGHTING CONTROL PROTOCOL. The entire disclosures of both applications are hereby incorporated by reference.

The distributed lighting control system 900 further comprises a bus supply 914, which receives the line voltage output of the power distribution system 120 and generates a DC voltage $V_{BUS}$ to power the digital communication link 912. According to the present invention, a user can enable and program the startup sequence using the GUI software of the PC 134. The PC 134 is operable to transit commands to the load control modules 910 via the bus supply 914 to download all or part of the system database to each of the load control modules.

The load control modules 910 directly receive the contact closure output signal 128 from the power distribution system 120. Accordingly, each load control module 910 is operable to store the startup-delay mode bit (which determines whether the startup-delay mode is enabled) and a startup time period (which determines how long the load control module waits after the contact closure output signal 128 is asserted before turning on the connected lighting load 114). Upon power up, each load control module 910 is operable to maintain the lighting load 114 off while waiting for the second predetermined amount of time for the contact closure output signal 128 to be asserted. If the contact closure output signal 128 is asserted (within the second predetermined amount of time), the load control device 910 continues to maintain the connected lighting load 114 off after the startup time period elapses. Otherwise, the load control device 910 is operable to turn the connected lighting load 114 on to the last known light level when the second predetermined amount of time expires.

While the present invention has been described with reference to the centralized lighting control systems 100, 800 and the distributed lighting control system 900, the method of the present invention could also be applied to any type of lighting control system that comprises a plurality of load control modules. The method of the present invention could also be applied to a control system for any type of controllable electrical load, such as a motor load.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method of controlling a plurality of load control devices for controlling the amount of power delivered to a plurality of electrical loads from a power distribution system in order to prevent abnormal operation of the power distribution system, the method comprising the steps of:
   applying power to the plurality of load control devices;
   waiting for a first control signal for a first predetermined amount of time after the step of applying power to the plurality of load control devices before powering up any of the electrical loads, the first control signal representative of stable operation of the power distribution system;
   sequentially powering up each of the plurality of electrical loads if the first control signal is received within the first predetermined amount of time after the step of applying power; and
   powering up all of the electrical loads if the first control signal is not received within the first predetermined amount of time after the step of applying power.

2. The method of claim 1, wherein the step of sequentially powering up each of the plurality of electrical loads comprises:
   powering up a first one of the plurality of loads at a first time; and
   powering up a second one of the plurality of loads at a second time that is different from the first time.

3. The method of claim 2, wherein the step of sequentially powering up each of the plurality of loads further comprises:
   powering up a third one of the plurality of loads at a third time that is different from the first and second times.

4. The method of claim 3, wherein the first, second, and third times are configurable by a user.

5. The method of claim 1,
   wherein the first control signal representative of stable operation of the power distribution system comprises a contact closure output signal generated by the power distribution system.

6. The method of claim 5, comprising the step of:
   each of the load control devices receiving the first control signal representative of stable operation of the power distribution system from the power distribution system;
   wherein the step of sequentially powering up each of the plurality of loads comprises the load control devices sequentially powering up each of the plurality of loads at predetermined times in response to each of the load control devices receiving the first control signal.

7. The method of claim 1, further comprising the step of:
   receiving a second control signal representative of stable operation of the power distribution system from the power distribution system; and
   transmitting on a communication link the first control signal in the form of a digital message in response to the step of receiving the second control signal;
   wherein the step of sequentially powering up each of the plurality of loads comprises each of the load control devices powering up a respective one of the plurality of loads in response to each of the load control devices receiving the first control signal within the first predetermined amount of time after the step of applying power to the load control devices.

8. The method of claim 1, further comprising the step of:
   transmitting a digital message on a communication link after the first control signal is received and before the end of the first predetermined amount of time;
   wherein the step of sequentially powering up each of the plurality of loads comprises sequentially powering up each of the plurality of loads in response to each of the load control devices receiving the digital message transmitted on the communication link within the first predetermined amount of time after the step of applying power to the load control devices.

9. The method of claim 1, further comprising the step of:
   delaying a second predetermined amount of time after receiving the first control signal within the first predetermined amount of time before sequentially powering up each of the plurality of loads.

10. The method of claim 1, wherein the plurality of electrical loads comprise a plurality of lighting loads.

11. A load control system for controlling the amount of power delivered to a plurality of electrical loads from a power distribution system, the load control system comprising:
    a plurality of load control devices, each load control device coupled to a respective one of the plurality of electrical loads, each load control device operable to wait for a first control signal for a first predetermined amount of time after power is applied to the load control device before turning on the respective electrical load, the first control signal representative of stable operation of the power distribution system, each of the load control devices operable to turn on the respective electrical load in sequence if the first control signal is received within the first predetermined amount of time after power is applied to the load control device to prevent abnormal operation of the power distribution system;
    wherein each load control device is further operable to power up the respective electrical load if the first control signal is not received within the first predetermined amount of time after power is applied to the load control device.

12. The load control system of claim 11, further comprising:
a central processor operatively coupled to the load control devices for controlling the amount of power delivered to each of the plurality of load control devices.

13. The load control system of claim 12, wherein the central processor is operable to control when each of the electrical loads turns on in sequence.

14. The load control system of claim 13, wherein the central processor includes a startup sequence schedule defining the times when each of the electrical loads turns on.

15. The load control system of claim 14, wherein the central processor is operable to receive a second control signal from the power management system, the second control signal representative of stable operation of the power distribution system.

16. The load control system of claim 15, wherein the central processor begins the startup sequence schedule in response to receiving the second control signal representative of stable operation of the power distribution system, each of the load control devices coupled to a communication link, whereby the first control signal is transmitted to the plurality of load control devices after the central processor begins the startup sequence schedule and before the end of the first predetermined amount of time.

17. The load control system of claim 15, wherein the central processor waits for the second control signal to be representative of stable operation of the power distribution system for a second predetermined amount of time before turning on the electrical loads.

18. The load control system of claim 15, wherein the second control signal representative of stable operation of the power distribution system is a contact closure output signal.

19. The load control system of claim 11, further comprising:
first and second central processors operatively coupled to the load control devices for controlling the amount of power delivered to each of the plurality of load control devices, the first and second central processor coupled to a communication link for transmitting and receiving digital messages, the first and second central processors operable to turn on each of the electrical loads in sequence as part of a startup sequence schedule.

20. The load control system of claim 19, wherein the first central processor is operable to receive a second control signal representative of stable operation of the power distribution system, and to transmit a digital message representative of the second control signal to the second central processor.

21. The load control system of claim 20, wherein the first central processor begins the startup sequence schedule in response to receiving the second control signal representative of stable operation of the power distribution system, and the second central processor begins the startup sequence schedule in response to receiving the digital message representative of the second control signal.

22. The load control system of claim 11, wherein each of the load control devices waits to receive a second control signal representative of a desired amount of power to be delivered to the respective electrical load for a second predetermined amount of time before turning on the electrical loads.

23. The load control system of claim 11, wherein the first control signal comprises a contact closure output signal representative of stable operation of the power distribution system, each of the load control devices is operable to receive the contact closure output signal from the power distribution system, and each of the load control devices has stored in memory when to turn on the electrical loads after receiving the contact closure output signal such that the electrical loads turn on in sequence.

24. The load control system of claim 11, wherein the plurality of electrical loads comprise a plurality of lighting loads.

25. The method of claim 7, wherein the second control signal representative of stable operation of the power distribution system is a contact closure output signal generated by the power distribution system.

* * * * *